United States Patent
Auphan et al.

[11] 3,721,758
[45] March 20, 1973

[54] CAMERA SCANNING DEVICE AND ANALYZING APPARATUS COMPRISING SUCH A DEVICE

[75] Inventors: Michel Joseph Auphan, Courbevoie; Jean Robert Perilhou, Bourg-la-Reine, both of France

[73] Assignee: U.S. Philips Corporation, New York, N.Y.

[22] Filed: April 16, 1971

[21] Appl. No.: 134,802

[30] Foreign Application Priority Data

April 17, 1970 France..............................7014012

[52] U.S. Cl............................178/7.2, 178/DIG. 2
[51] Int. Cl..........................H04n 3/10, H04n 5/26
[58] Field of Search............178/7.1, 7.2, DIG. 2, 7.85

[56] References Cited
UNITED STATES PATENTS

| | | |
|---|---|---|
| 3,279,460 | 10/1966 | Sheldon..........................178/DIG. 2 |
| 3,290,505 | 12/1966 | Stavis............................178/DIG. 2 |
| 3,328,594 | 6/1967 | Sheldon..........................178/DIG. 2 |

*Primary Examiner*—Robert L. Richardson
*Attorney*—Frank R. Trifari

[57] ABSTRACT

A plurality of analyzing fibers are arranged in the hollow shaft of one of the motors of a scanning device substantially in crown-like fashion around the optical center in the case of a single fiber, while the electron beam of the cathode-ray tube is caused to perform a wobbling movement so that the center of the beam is shifted in place along the scanning line corresponding to the case of a single fiber.

The device is used in medical endoscopy.

11 Claims, 3 Drawing Figures

INVENTORS.
CLETUS E. LORENSEN
BY  JOHN A. PETERSON
ATTORNEY

CAMERA SCANNING DEVICE AND ANALYZING APPARATUS COMPRISING SUCH A DEVICE

The present patent of addition relates to a camera scanning device particularly suitable for use in endoscopy and more particularly for use in analyzing apparatus of the kind described in my main Patent.

According to the main patent, i.e. U.S. Pat. No. 3,532,037, the device comprises two scanning beam deflection elements arranged at the end of the hollow shaft of the rotor of a first motor and at the end of the rotor shaft of a second motor coaxial to the former, the hollow shaft comprising an optical emission fiber and at least one optical analyzing fiber, one of the ends of which is located near the focal plane of a lens between the optical fibers and the corresponding deflection element.

In one embodiment of an analyzing apparatus described, comprising such a scanning device, the light captured by the analyzing fiber is guided to the photocathode of a photo-multiplier which supplies an electrical signal proportional to the received light intensity. Subsequent to amplification, the signal is applied to the Wehnelt cylinder of a cathode-ray tube, the scanning of which varies with the scanning of the surface to be analyzed so that the image of the latter is reproduced on the screen of the tube.

The definition of the resultant image is limited on the one hand by the diameter of the optical fibers and on the other hand by the maximum speed of rotation of the synchronous motors used.

It is difficult to reduce the fiber diameter without excessive alteration of the overall sensitivity of the device.

With fibers of a diameter of about 20 $\mu m$ the definition of the image is at the most 200 line pairs. Such a value may be considered to be sufficient for most of the uses envisaged. However, the micro-motors actually available do not permit of utilizing this resolving power completely.

The number of revolutions per second is approximately equivalent to the number of lines scanned per second (these lines have an approximately sinusoidal course). In general, a compromise is found between the number of lines per second and the number of frames per second. In television 50 frames per second are used with an interlacing of the order of 2, which provides an image of a complete number of lines 25 times per second.

The present invention provides improvements in the analyzing apparatus and the scanning device which provide an improvement in the apparent definition of the image without increasing the speed of rotation of the motors.

The invention has for its object to choose a combination of a comparatively low number of lines per frame, while maintaining a frame frequency of about 25.

According to the invention the analyzing apparatus, in which the scanning device comprises two deflectors for the luminous scanning beam arranged at the end of the hollow shaft of the rotor of a first motor and at the opposite end of the rotor shaft of a second motor, coaxial to the former, the hollow shaft comprising an optical emission fiber and at least one analyzing optical fiber, one of the ends of which is located near the focal plane of a lens arranged between said fibers and the deflecting element, means being provided for transforming the light intensity provided by said analyzing fibers into an electrical signal applied to the Wehnelt cylinder of a cathode-ray tube providing an electron beam, is characterized in that a plurality of analyzing fibers are arranged substantially in a crown-like fashion around the optical center corresponding to one analyzing fiber and in that means are provided on the one hand for carrying out a circular commutation of the paths corresponding to each of the analyzing fibers and on the other hand for providing wobbling of the electron beam, the center of which is displaced along the scanning line corresponding to a single fiber.

The analyzing fiber crown permits of scanning an additional network of curves on the scanned surface, while the various means permit of reproducing these additional curves on the screen of the cathode-ray tube and hence of improving the definition without modifying the speed of the motors.

The invention will be better understood with the aid of the following description given by way of example with reference to the accompanying drawing, in which.

Figure 1:
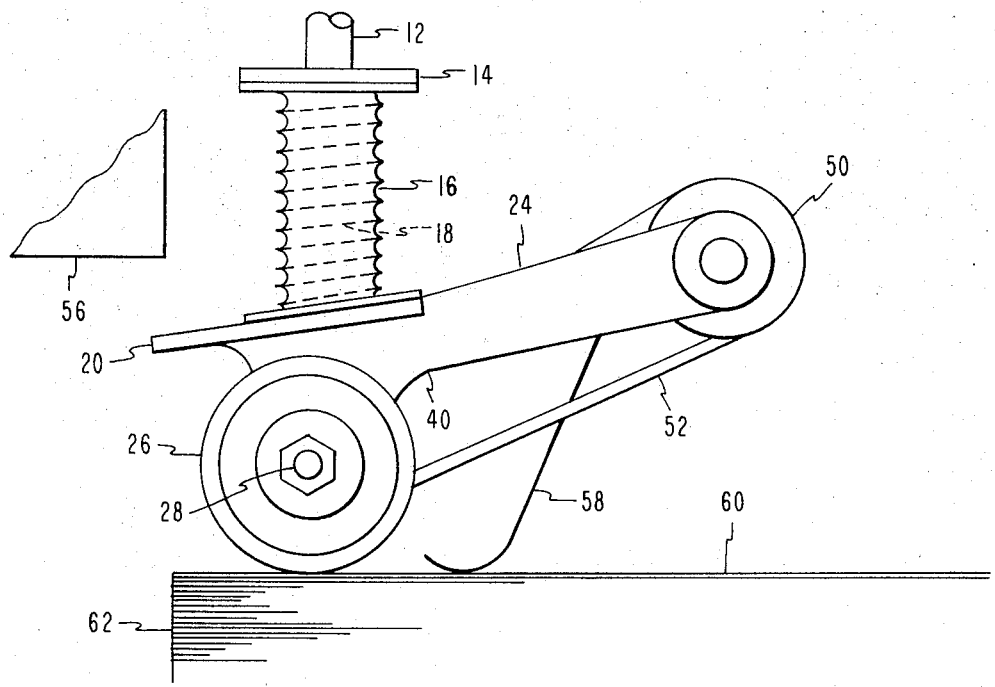
FIG. 1 shows a basic diagram of the apparatus comprising a camera with a scanning device according to the invention.

The scanning principle disclosed in the U.S. Pat. No. 3,532,037 for a device comprising one or more emission fibers and a single analyzing fiber will be briefly set out with reference to FIGS. 1 and 2, for the general case in which the device comprises a plurality of analyzing fibers in accordance with the invention.

The scanning device comprises two micro-motors 1 and 2 arranged opposite each other, the pole pieces of the stators 3 and 4 of which are interconnected by a transparent sheath 5 (glass or plastics) so that the scanning beam 6 can penetrate to the surface 7 to be scanned. The surface 7 is approximately cylindrical.

The respective coils of the two stators are designated by reference numerals 8 and 9 and the rotors of each of the two micromotors are shown at 10 and 11, respectively, with a common axis of rotation XX.

The shaft 12 of the rotor 10 is hollow and permits of passing via at least one emissive fiber 13 the common light from the source 5 to the focus of a convergent lens 14. The lens 14 is mounted in the shaft 12 in front of the first deflecting element 15, which provides a small deflection, for example, a prism mounted at the end of the shaft 12.

The light beam refracted by the rotating prism 15 is then reflected from a mirror 16 or by a total reflection prism towards the surface portion to be analyzed, while the mirror 16 is driven by the rotating rotor 11.

The light diffused by the surface 7, subsequent to reflection from the mirror 16 and refraction by the prism 15, is caused to converge by the lens 14 and is focused to the emission fiber(s) and also to the analyzing fibers 17, 18 and 19, the ends of the fibers being slightly defocused in order to obtain a spot of small dimensions instead of a point.

According to the invention a plurality of analyzing fibers replaces the single analyzing fiber described in the Main Patent, said fibers being arranged in substantially crown-like fashion around the optical center of said single analyzing fiber.

Figure 2:
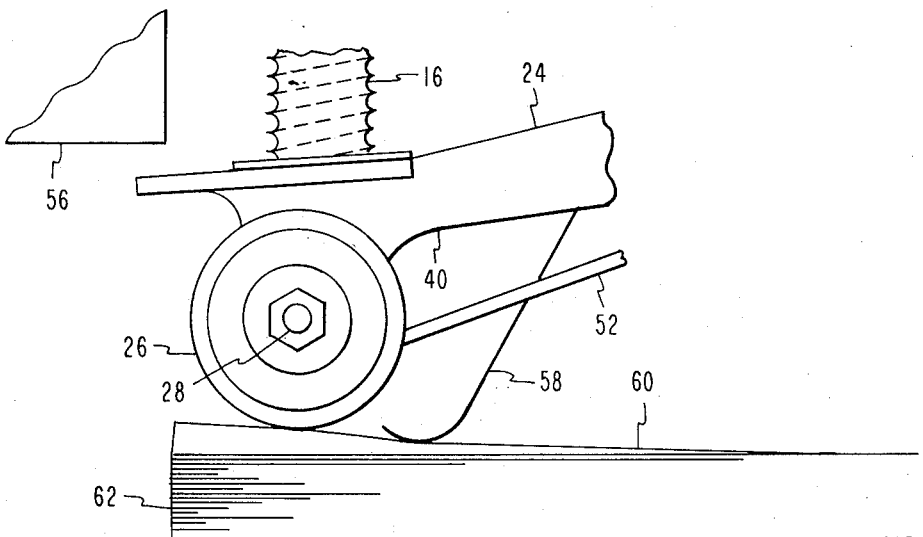
FIG. 2 shows a sectional view on an exaggerated scale of the hollow shaft of the motor of the scanning device, illustrating an example of the distribution of the emissive fibers and analyzing fibers.

The scanning device shown in FIG. 1 comprises three analyzing fibers 17, 18 and 19, which are also shown in FIG. 2. The latter figure also shows a plurality of emission fibers 13a, 13b, 13c, 13d, which permit of obtaining an improved illumination of the surface to be analyzed. The principle of the invention is, however, not modified thereby.

Figure 3:
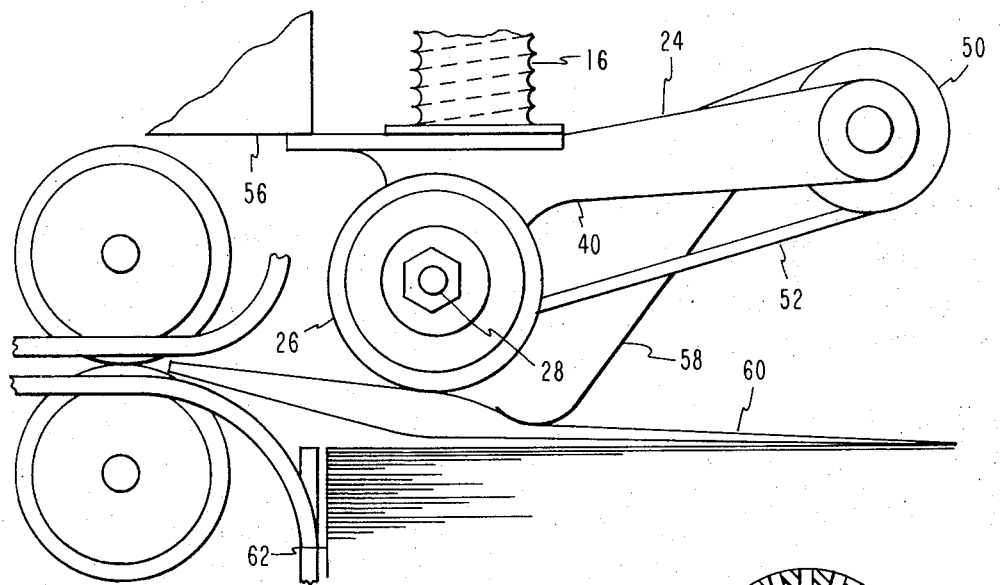
FIG. 3 shows a developed view of a portion of a cylinder to be analyzed with a projection of the analyzing fibers (in this case three).
Figure 5:
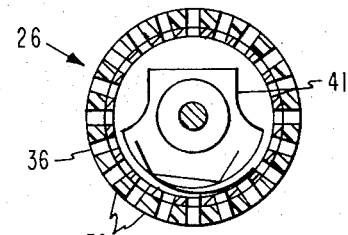
Figure 4:
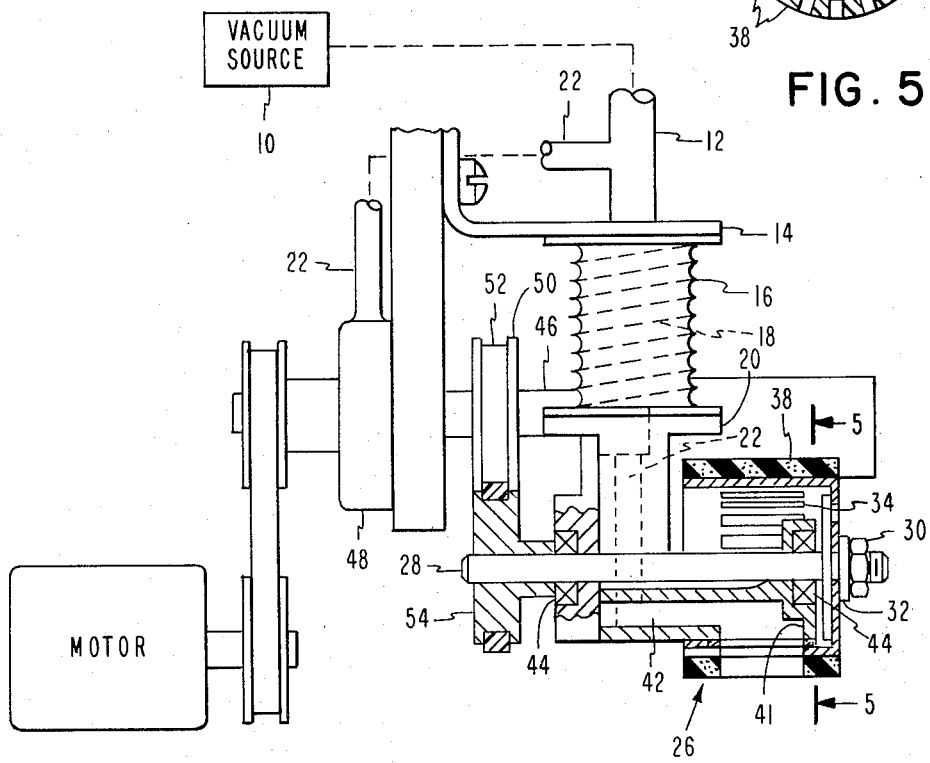
Figure 1:
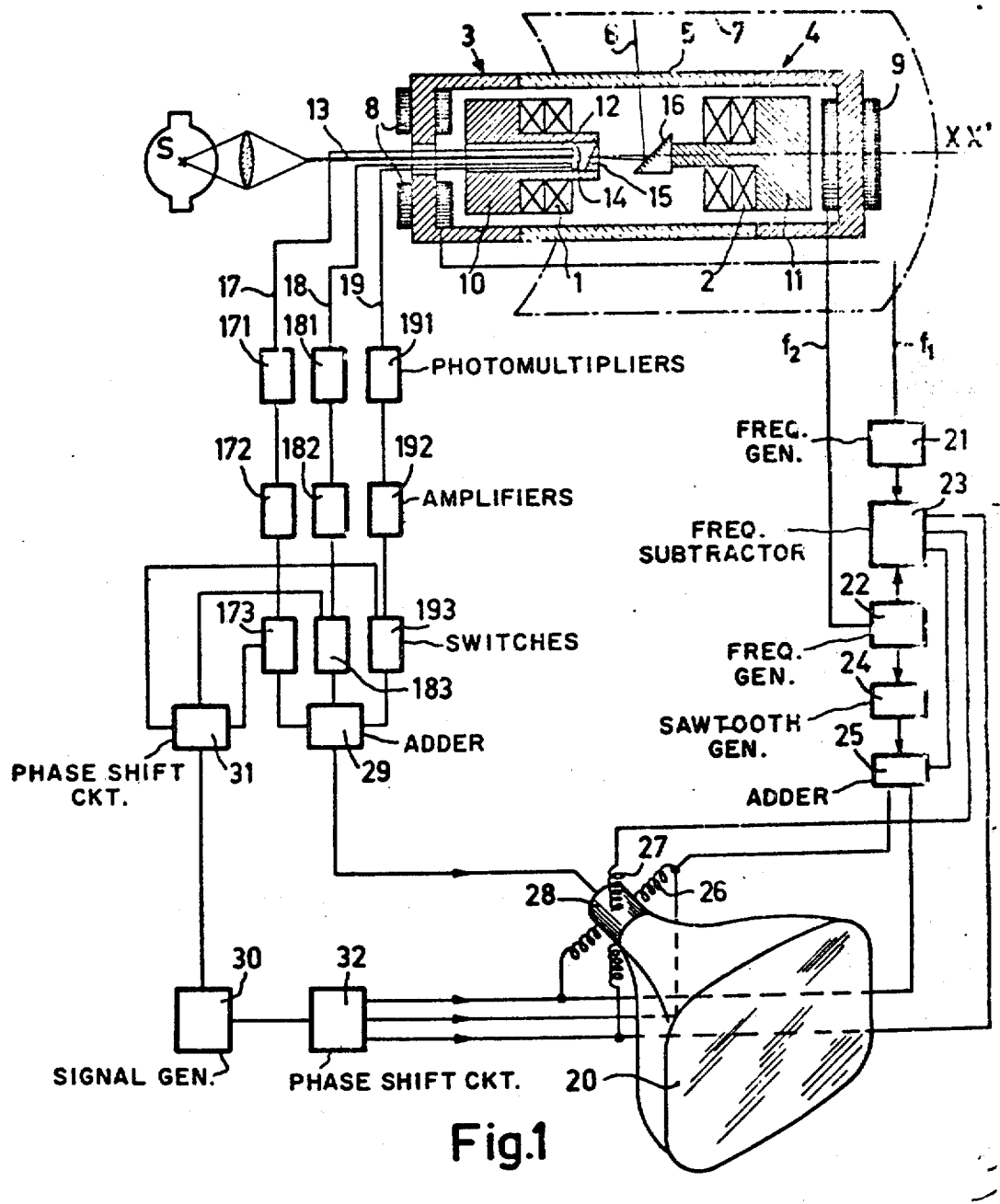
Figure 2:
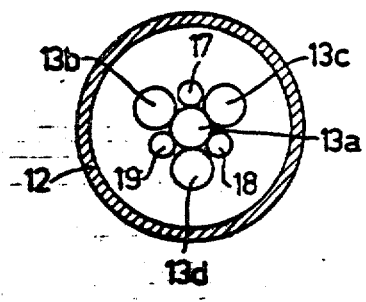
Figure 3:
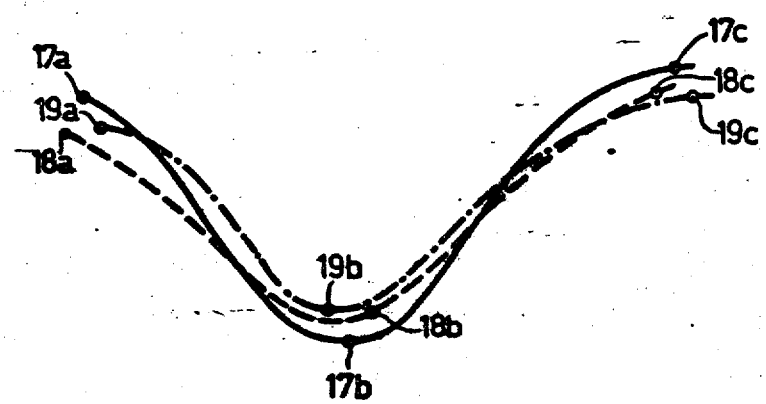

In this way each of the analyzing fibers scans the surface 7 along a substantially sinusoidal curve (see FIG. 3, a developed view of a series of three curves with a projection of the fibers in three different positions indicated by letters a, b, c, associated with the reference numerals of the corresponding fibers). Under these conditions the number of curves scanned is increased and the definition is thus improved. In order to display this series of additional curves on the oscilloscope 2 by means of a single electron beam, the invention provides various means contributing to the following operations: In addition to the various movements the electron beam performs for scanning an endoscopic image, it carries out by means of two modulations in orthogonal directions a wobbling movement, that is to say it traces a circular path the center of which shifts in place along the main line scanned by the non-wobbling beam. In order to distribute, during the rotation, the information relating to each of the reading fibers scanning the area of the light spot at the instant under consideration, a circular commutation of the paths corresponding to each of the reading fibers is carried out so that each path is released when the reading fiber under consideration corresponds to the position of the spot at the instant concerned. In order to acquire this coincidence
— the rotational frequency of the motor being $f_1$ and the wobbling frequency of the electron beam being $\phi$
— the commutation frequency of the paths corresponding to the fibers has to be $f_1 \pm \phi$ in accordance with the sense of rotation of the motors.

At each rotation of the mirror (by the higher speed motor) the projections of the three reading fibers turn over 360° around the center of a circle passing through these three points. For a cycle of the motor it is necessary to take this advance (or this retardation) due to the 360° rotation of the projections of the three fibers into account in the commutation of the paths of the three fibers.

Hereinafter a mode of operation and scanning of the cathode-ray tube 20 of the kind described in the main patent will be briefly described and an embodiment of the various means described above will be set out with reference to FIG. 1.

For scanning of the tube 20 the following circuits described in the main patent are available: two frequency generators 21 and 22 supply signals of frequencies $f_1$ and $f_2$ respectively, which are applied to the motors 1 and 2, respectively. The difference frequency $(f_1 - f_2)$ is constant and the frequency subtractor 23 provides an output signal of constant frequency and amplitude and of variable phase. One of the two generators, in this case 22, also serves to excite with a suitable phase a sawtooth generator 24. An amplitude adder 25 permits of adding the output signal of the subtractor 23 with variable amplitude and phase to the sawtooth signal supplied by the generator 24. The scan of the cathode-ray tube 20 is carried out by applying to the deflection coils 26 and 27:

horizontal: a signal from the adder 25 resulting from the addition of a sawtooth voltage released as the case may be at each revolution of the motor 1 or 2 and of a sinusoidal voltage of a greater or smaller amplitude and of a frequency $(f_1 - f_2)$;

vertical: a sinusoidal voltage of suitable amplitude and phase and of a frequency $(f_1 - f_2)$. The signal applied to the Wehnelt cylinder 28 of the cathode-ray tube results from the following transformations: the light captured by each analyzing fiber 17, 18, 19 is guided to the photo-cathode of a photo-multiplier 171, 181 and 191, respectively, which supplies an electrical signal proportional to the light intensity captured. Subsequent to amplification (amplifiers 172, 182, 192) the three signals are transmitted to three switches 173, 183, 193, actuated in accordance with the invention so as to perform a circular commutation of the three paths.

For controlling the circular commutation of the paths, a generator 30 is provided which supplies a signal of the frequency $f_1$ equal to the frequency of the motor 1 in the form of a square-wave of a width equal to or larger than ¾ cycle. This signal is supplied to a three-position phase-shifting circuit 31.

The signals from the switches are added in an adder 29 and then applied to the Wehnelt cylinder 28.

In order to obtain the wobble of the electron beam in accordance with the invention, the deflection coils 26 and 27 may have applied to them two additional signals of a frequency $\phi$ obtained from a single signal applied to a 90° phase shifting circuit (32).

Obviously, the wobble could also be obtained by means of auxiliary coils.

The improvements provided by the invention are particularly important because it is thus possible to obtain a more satisfactory definition at the speeds of the micro-motors actually available for medical endoscopy.

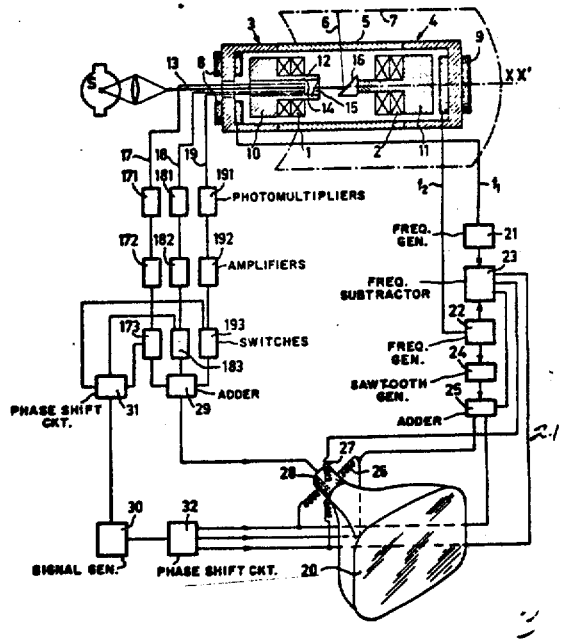

What is claimed is:

1. An analyzing apparatus comprising, a first motor having a hollow rotor shaft and a second motor with a rotor shaft coaxial with and spaced from said hollow rotor to form two facing ends on the rotors, means for passing a scanning light beam through said hollow rotor shaft, a first light deflection element arranged near the facing end of said hollow shaft and rotatable therewith so as to intercept and deflect said light beam, a second light deflection element arranged at the facing end of the shaft of the second motor and rotatable therewith and positioned to intercept and reflect the light beam after deflection by said first deflection element, a plurality of optical analyzing fibers arranged in said hollow shaft in a substantially crown-like manner around the optical center corresponding to the case where a single analyzing fiber is used, the ends of said fibers being located near the focal plane of a lens arranged inside the hollow shaft between the optical fibers and the first deflection element, means responsive to the light received via said analyzing fibers for producing electric signals corresponding thereto, a cathode ray tube having an electrode for controlling the electron beam which is arranged to be responsive to said electric signals, and means for providing a circular commutation of the signal paths corresponding to each of the analyzing fibers and for producing a wobbling movement of the CRT electron beam, the center of which is displaced along the scanning line corresponding to the case of a single fiber.

2. An analyzing apparatus as claimed in claim 1 wherein said means for producing the wobble of the electron beam comprises means for applying an additional signal to each of the deflection coils of the cathode ray tube.

3. An analyzing apparatus as claimed in claim 4 characterized in that the frequency of the circular commutation of the paths is chosen to be equal to $f_1 \pm \phi$, in which $\phi$ designates the wobble frequency and $f_1$ the frequency of rotation of the first motor.

4. An analyzing apparatus as claimed in claim 1 wherein said CRT electrode comprises the Wehnelt cylinder, and said commutation means comprises switching means connected between the output of said electric signal producing means and the Wehnelt cylinder and means for selectively operating said switching means to selectively pass the signals corresponding to said plurality of analyzing fibers.

5. An analyzing apparatus as claimed in claim 4 further comprising, means for driving the first motor at a frequency $f_1$ and means for driving the second motor at a frequency $f_2$, and means for applying a sinusoidal voltage of frequency $f_1-f_2$ to one set of deflection coils of the CRT.

6. A scanning device for a surface to be analyzed comprising, means for transmitting a light beam along a given axis, a first light deflection element rotatable about said axis and positioned to intercept and deflect said light beam, a second light deflection element rotatable about said given axis and positioned to intercept and reflect the light beam deflected by said first deflection element, a plurality of optical analyzing fibers circularly arranged about an axis approximately parallel to said given axis so as to receive the scanning light from said surface, a cathode ray tube display device with an electron beam control electrode, means coupled to said optical fibers for converting the light received into proportional electric signals and supplying same to said control electrode via corresponding electric signal paths, means for sequentially commutating said signal paths, means for deflecting the CRT electron beam in synchronism with the rotation of said deflection elements, and means for producing a wobbling movement of said electron beam.

7. A scanning device as claimed in claim 6 wherein said light transmitting means comprises an optical fiber extending along said given axis and said control electrode comprises the Wehnelt cylinder of the CRT.

8. A scanning device as claimed in claim 6 further comprising, first and second motors with coaxially arranged rotor shafts, the rotor shaft of said first motor being hollow so as to accommodate therein said optical fibers, said light transmitting means, said first deflection element at one end of the hollow shaft, and a lens located between said fibers and the first deflection element so that the ends of the fibers are located near the focal plane of the lens, the second deflection element being secured to the end of the second motor rotor shaft which faces said one end of the first motor shaft.

9. A scanning device as claimed in claim 6 further comprising means for rotating said first deflection element at a frequency $f_1$, and wherein said wobble producing means includes means for applying signals of a frequency $\phi$ to the deflection coils of the CRT.

10. A scanning device as claimed in claim 9 including means for commutating said signal paths at a frequency $f_1 \pm \phi$.

11. A scanning device as claimed in claim 6 further comprising, first and second motors with coaxially arranged rotor shafts to which said first and second deflection elements are secured, the rotor shaft of said first motor being hollow to accommodate said analyzing fibers and an axially extending fiber that forms said light transmitting means, first and second means for generating sinusoidal voltages of frequencies $f_1$ and $f_2$, respectively, means responsive to said first and second generating means for deriving a sinusoidal voltage of the difference frequency, means for applying said difference frequency voltage to one set of deflection coils of the CRT, and means for coupling the outputs of said first and second generating means to the stator windings of said first and second motors to drive same at the frequencies $f_1$ and $f_2$, respectively.

* * * * *

UNITED STATES PATENT OFFICE
CERTIFICATE OF CORRECTION

Patent No. 3,721,758      Dated March 20, 1973

Inventor(s) MICHEL JOSEPH AUPHAN ET AL

It is certified that error appears in the above-identified patent and that said Letters Patent are hereby corrected as shown below:

col. 1, line 4, cancel "patent of addition" and insert -- invention --;

line 7, cancel "my" and insert -- our --;

line 45, cancel "course" and insert -- shape --;

col. 2, line 30, cancel the period (.) and insert -- , and --;

Cancel sheets 1 and 2 of the drawings and substitute the attached sheets.

Cancel the illustrative drawing on the front page format and substitute Fig. 1.

Signed and sealed this 26th day of February 1974.

(SEAL)
Attest:

EDWARD M. FLETCHER, JR.
Attesting Officer

C. MARSHALL DANN
Commissioner of Patents